United States Patent [19]

Anttila

[11] Patent Number: 4,588,345

[45] Date of Patent: May 13, 1986

[54] APPARATUS FOR LIFTING AND TRANSPORTING A UNITARY LOAD

[75] Inventor: Arjo Anttila, Helsinki, Finland

[73] Assignee: Valmet Oy, Finland

[21] Appl. No.: 696,090

[22] Filed: Jan. 29, 1985

[30] Foreign Application Priority Data

Feb. 6, 1984 [FI] Finland ..................................... 840480

[51] Int. Cl.⁴ ..................................... B60P 3/40

[52] U.S. Cl. ..................................... 414/458; 280/43.23; 294/1.1; 414/607; 414/909

[58] Field of Search ............... 414/458, 459, 498, 607, 414/608, 909; 280/43.23; 294/1.1

[56] References Cited

U.S. PATENT DOCUMENTS

| | | | |
|---|---|---|---|
| 3,156,484 | 11/1964 | Talbert | 414/458 X |
| 3,253,668 | 5/1966 | Tantlinger | 414/458 X |
| 3,348,711 | 10/1967 | Gove | 414/459 |
| 3,476,275 | 11/1969 | Cowlishaw et al. | 414/498 |
| 3,570,694 | 3/1971 | Tantlinger | 414/458 |
| 3,631,999 | 1/1972 | Walerowski | 414/458 |
| 3,795,336 | 3/1974 | Acker et al. | 414/458 |
| 4,252,495 | 2/1981 | Cook | 414/608 |

*Primary Examiner*—Robert J. Spar
*Assistant Examiner*—Stuart J. Millman
*Attorney, Agent, or Firm*—Steinberg & Raskin

[57] ABSTRACT

Apparatus for lifting and transporting a unitary load, such as a material containing container, comprises transport apparatus, such as a truck provided with gripping members for lifting one end of the load from a surface, and a separate auxiliary device provided with wheels for carrying the opposite end of the load during transport. The apparatus includes a control for directing the movement of the auxiliary device to the opposite end of the load. The auxiliary device includes apparatus for gripping and then lifting the opposite end of the load for subsequent transport thereof. The auxiliary device may be arranged to move over the top of the load to the opposite end thereof for lifting the same from the surface for subsequent transport of the load.

9 Claims, 17 Drawing Figures

APPARATUS FOR LIFTING AND TRANSPORTING A UNITARY LOAD

BACKGROUND OF THE INVENTION

The present invention relates to apparatus for transporting unitary loads, such as material containing containers.

More particularly, the present invention relates to apparatus for transporting unitary loads, the apparatus comprising transport means, such as a truck provided with gripping members for lifting one end of the unitary load from the surface, and separate auxiliary means provided with wheels for supporting the opposite end of the load during transport.

The transport of large unitary loads, such as containers, is extremely cumbersome, especially where the free or available space in the region of the unitary load is limited. Many containers have such large outer dimensions that transporting the same by lifting only one of their ends is not feasible.

One conventional technique by which large loads of this type have been moved is through the use of a so-called straddle truck or large moving crane provided with wheels which are spaced widely apart and having a body in which a free downwardly opening space is formed so that the truck can be driven over the load. However, a straddle truck is an expensive piece of equipment and, moreover, the wheels which are situated on respective sides of the load being lifted require so much space as to limit the manner in which the loads can be handled. For example, it is not possible using a straddle truck to deposit large containers in side-by-side relationship, either touching or slightly spaced from each other.

Other conventional arrangements for transporting containers include the use of transport means, such as a fork lift truck, in combination with a so-called float wagon. It is further known in the prior art to employ separable wheel units which are releasably attached to the bottom of a container at one of its ends which raises the container on the wheels of the unit. A typical design of this type of device is disclosed in U.S. Pat. No. 3,570,694. However, the use of separable wheel units is somewhat awkward and it has not been possible to develop smoothly operating container transport systems using such separable wheel units.

SUMMARY OF THE INVENTION

Accordingly, it is an object of the present invention to provide new and improved apparatus for lifting unitary loads from a surface and transporting the loads over the surface.

Another object of the present invention is to provide new and improved apparatus for lifting and transporting unitary loads which eliminate the drawbacks mentioned above.

Briefly, in accordance with the present invention these and other objects are attained by providing an improvement in apparatus for lifting and transporting a unitary load which includes transport means for lifting a first end of the load from the surface and separate auxiliary means provided with wheels for carrying the opposite end of the load during transport.

According to the invention, control means are provided for directing the movement of the auxiliary means to the opposite end of the load from that lifted by the transport means and providing the auxiliary means with means for gripping and then lifting the opposite end of the load for subsequent transport thereof.

The control means of the auxiliary means preferably comprises remote-control means by which the movement of the auxiliary means can be directed from a remote location, e.g., from the transport means. Such remote-control means may be provided in a known manner such, for example, by means of an electric cable or by means of a wireless transmission system, such as by radio or infra-red light control. The energy required by the auxiliary means may be obtained from the transport means itself over an electric cable or by means of a flexible hydraulic conduit. It is also possible to provide the auxiliary means with a separate power supply, such as a storage battery, an internal combustion engine, or the like.

According to an advantageous embodiment of the invention, the auxiliary means are arranged to move on the top of the load to the end thereof which is opposite from the end lifted by the transport means under the control of the control means. The auxiliary means then descends or lowers itself onto the surface while supported by a supporting member such, for example, as a wire cable. A gripping member of the auxiliary means then engages the load and lifts the load from the surface.

According to another embodiment of the invention, the auxiliary means may be arranged to move on the surface adjacent to the load to the opposite end thereof under the control of the control means thereby by-passing the load, whereupon the auxiliary means grip and lift the opposite end of the load for subsequent transport thereof.

According to still another embodiment of the invention, the auxiliary means are arranged to move over the top of the load to its opposite end whereupon a gripping member of the auxiliary means engages the load and a lifting member of the auxiliary means which is provided with wheels descends to rest on the surface to thereby lift that end of the load from the surface.

DETAILED DESCRIPTION OF THE DRAWINGS

A more complete appreciation of the present invention and many of the attendant advantages thereof will be readily understood by reference to the following detailed description of illustrative embodiments of the invention when considered in connection with the accompanying drawings in which:

FIGS. 2 to 7 are schematic side elevation views on an enlarged scale relative to FIG. 1 illustrating the operation of the apparatus shown in FIG. 1 in sequential steps, and wherein, FIG. 2 illustrates the lifting and transporting apparatus prior to coupling with the container to be transported;

FIG. 3 illustrates the auxiliary means of the lifting and transporting apparatus after it has moved to the opposite end of the container;

FIG. 4 illustrates the descent of the auxiliary means at the opposite end of the container;

FIG. 5 illustrates the auxiliary means at the opposite end of the container after it has completed its descent to the surface;

FIG. 6 illustrates the auxiliary means with its gripping member coupled to the container;

FIG. 7 illustrates the auxiliary means after it has lifted the container end from the surface;

FIGS. 12–14 are schematic side elevation views of another embodiment of auxiliary means of lifting and transporting apparatus in accordance with the invention and illustrating the operation of the apparatus in sequential steps, wherein, FIG. 12 illustrates the auxiliary means after it has moved to the opposite end of the container;

FIG. 13 illustrates the auxiliary means at the stage where a lifting member forming a component thereof has rotated to a substantially vertical position;

FIG. 14 illustrates the auxiliary means wherein the lifting member has been lowered to engage the surface;

DESCRIPTION OF THE PREFERRED EMBODIMENTS

Figure 1:
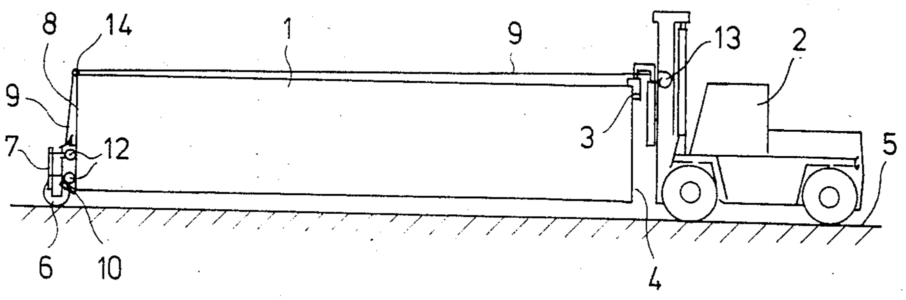
FIG. 1 is a schematic elevation view of one embodiment of apparatus for lifting and transporting a unitary load according to the invention and illustrating an application wherein the unitary load comprises a container.

Referring now to the drawings wherein like reference characters designate identical or corresponding parts throughout the several views and, more particularly, to the embodiment of the invention illustrated in FIG. 1, one embodiment of apparatus for lifting and transporting a unitary load in the form of a container 1 is illustrated. The apparatus comprises transport means 2 in the form of a fork truck, for lifting a first end 4 of the container 1 from the surface 5 and separate auxiliary means 7 for lifting and carrying the opposite end 8 of container 1 from the surface 5 during transport of the container. Auxiliary means 7 is provided with carrying wheels 6 which engage the surface 5 during transport of the load and transport wheels 12 on which the auxiliary means 7 move upon the container 1 from the first end 4 to the opposite end 8. In order to accomplish the transport of the auxiliary means 7 upon the container 1, at least one of the transport wheels 12 must be provided with its own drive so as to function as a traction wheel, the wheels 12 and drive constituting propelling means.

The auxiliary means 7 and the transport means 2 are interconnected by a supporting member in the form of a wire cable 9 which supports the auxiliary means 7 as the latter descends to the surface 5 as discussed below. The wire cable 9 may also be utilized to pull the auxiliary means 7 back into conjunction with the transport means 2 after the container 1 has been transported to the desired location. Additionally, the cable 9 may incorporate an electrical cable for transmitting control signals from the operator located in the fork truck 2 to the auxiliary means 7 to accomplish the operations described below.

Figure 2:
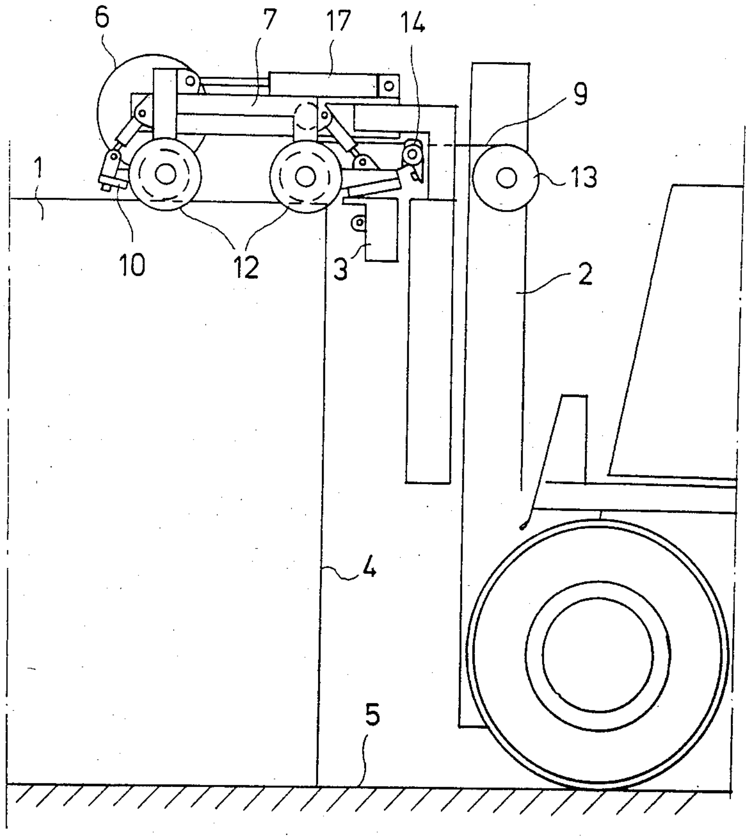

Referring to FIG. 2, the fork truck 2 with auxiliary means 7 attached thereto are shown approaching the container 1 to be transported. The fork truck 2 has already lifted the auxiliary means 7 to a position wherein it has engaged the top of the container 1 to be carried thereon by transport wheels 12. In the time immediately after that corresponding to the situation shown in FIG. 2, the fork truck 2 moves against the end 4 of container 1 whereupon an engagement member 3 is moved into locking engagement within an aperture provided in the upper corner of container 1. A signal is then transmitted to the drive of the traction wheel of transport wheels 12 so that the auxiliary means 7 begins to move towards the opposite end 8 of container 1 under remote control of the operator in truck 2. During this movement, the wire cable 9 attached to auxiliary means 7 unwinds from a wire drum 13 provided on fork truck 2.

Figure 3:
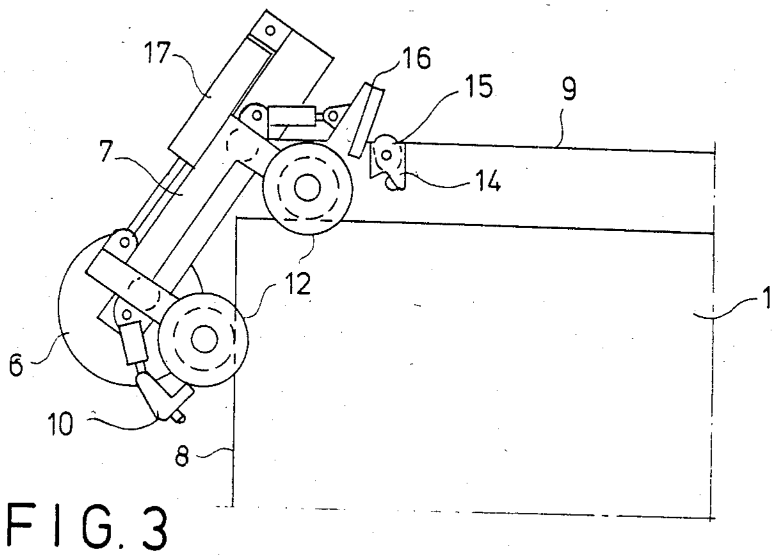
Figure 4:
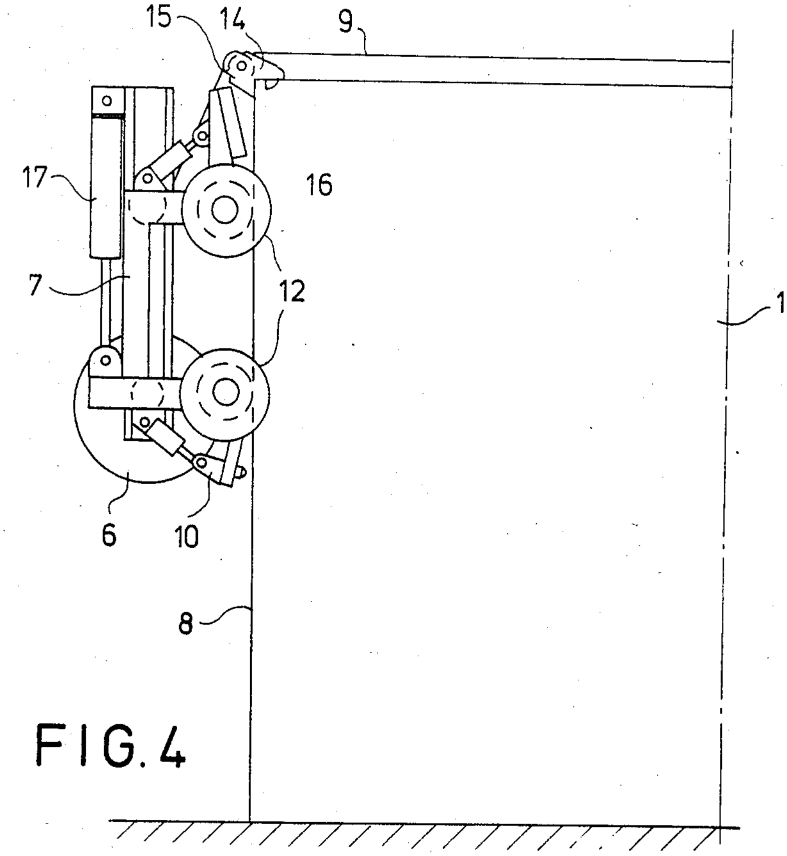

Referring to FIG. 3, the auxiliary means 7 has reached a position at the opposite end 8 of container 1 and turns around the top edge of the container. In order to prevent auxiliary means 7 from falling in an uncontrolled manner, the same is supported by the wire cable 9 which is connected to the transport means 2 at the other end 4 of container 1. After auxiliary means 7 has completed its turn around the top edge of container 1 so as to be substantially parallel with the vertical end 8 of container 1, a corner piece 14 associated with wire cable 9 anchors itself in an aperture at the top of container 1 near end 8 as seen in FIG. 4. A sheave 15 is journaled in corner piece 14 to prevent rubbing of the wire cable 9 against the edge of container 1 as the auxiliary means 7 descends downwardly along the vertical end 8 of container 1.

Figure 5:
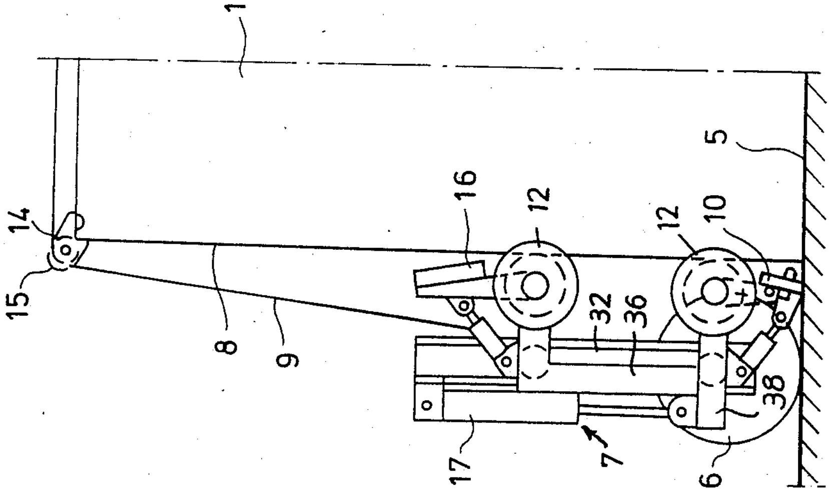

The auxiliary means 7 continues to descend supported by wire cable 9 until its carrying wheels 6 engage the surface 5 as seen in FIG. 5.

Figure 6:
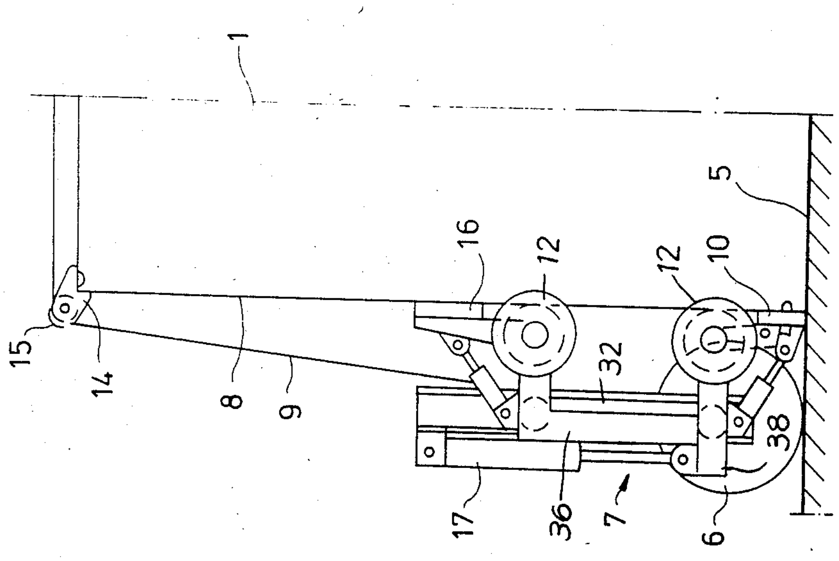

Referring to FIG. 6, when the auxiliary means 7 has descended to the position shown in FIG. 5, a gripping or engagement member 10 forming a part of auxiliary means 7 is engaged in the bottom edge of container 1. A position limiting member 16 is pivoted by means of a power cylinder into engagement with the end 8 of container 1.

Figure 7:
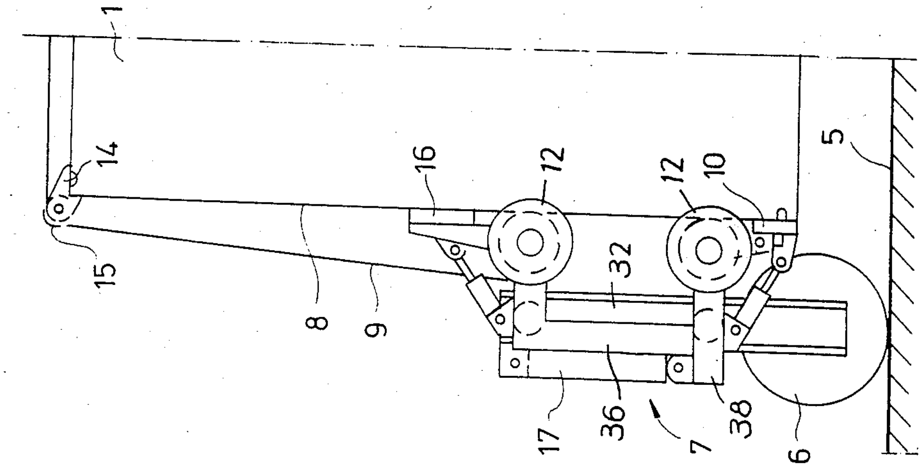
Figure 8:
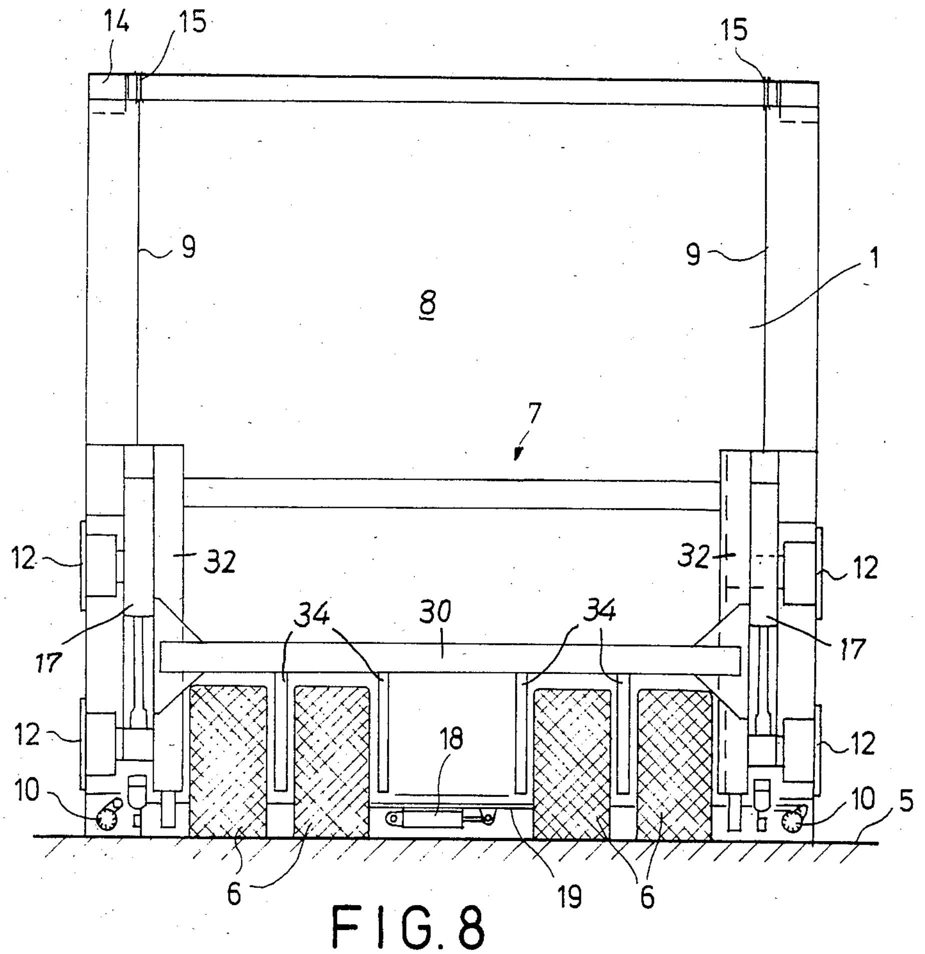
FIG. 8 is a schematic end elevation view illustrating the auxiliary means of the lifting and transporting apparatus of the invention in the stage illustrated in FIG. 6.

Referring to FIG. 7, means are provided for lifting auxiliary means 7 and the container 1 attached thereto from surface 5. In particular, auxiliary means 7 comprise first and second frames which are slidable with respect to each other. The first frame is formed by a horizontal beam 30 affixed at its ends to a pair of vertical beams 32. Carrying wheels 6 are journaled to beams 32 and intermediate vertical member 34 (FIG. 8). On the other hand, transport wheels 12 are journaled to the second frame which comprises a pair of side members 36 and a pair of lower member 38. The gripping or engagement member 10 is attached to the second frame. The first and second frames are interconnected to each other by a pair of piston-cylinder arrangement 17. When the auxiliary means 7 descends to its lowermost position, i.e., when the carrying wheels 6 engage the surface 5, the piston-cylinder arrangement 17 are actuated whereby the pistons thereof are drawn into the respective cylinders thereby raising the second frame of the auxiliary means 7 with respect to the first frame thereby lifting the end 8 of container 1 by gripping member 10 from surface 5, the carrying wheel 6 remaining in engagement with surface 5. The container 1 is now ready to be transported. Upon completion of transport, the above-described steps takes place in a reverse order whereupon the auxiliary means 7 are pulled back into conjunction with the transport means 2 with the aid of wire cable 9.

The end 8 of container 1 and auxiliary means 7 in the position illustrated in FIG. 6 is illustrated in FIG. 8. It is seen in FIG. 8 that a locking cylinder 18 is coupled to the engagement members 10 through a connecting rod 19 so that actuation of cylinder 18 will cause the engagement members 10 to rotate. When the engagement members 10 are in position within apertures formed in the bottom edge of container 1, they are rotated through actuation of cylinder 18 to lock within respective apertures 21, described in greater detail below with respect to FIGS. 10 and 11.

Figure 9:
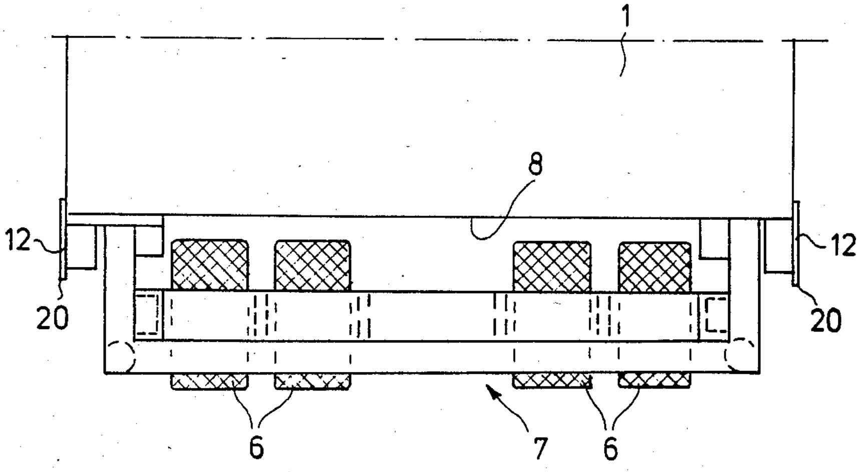
FIG. 9 is a top plan view of the auxiliary means of FIG. 8.

A top view of auxiliary means 7 is illustrated in FIG. 9. As seen in FIG. 9, the transport wheels 12 are so located in the direction of the width of container 1 that flanges 20 thereof guide auxiliary means 7 in precise registration with the top of container 1.

Figure 10:
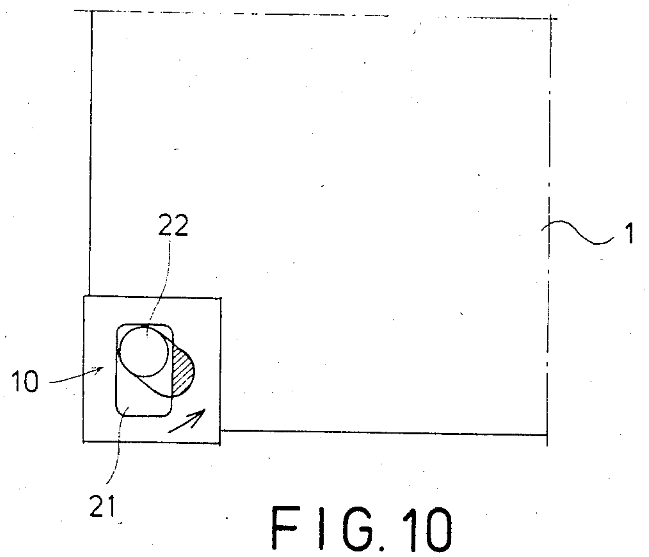
FIG. 10 is a schematic illustration of the engagement member of the auxiliary means of the lifting and transporting apparatus at the stage illustrated in FIG. 8, the engagement member being in the locking phase.
Figure 11:
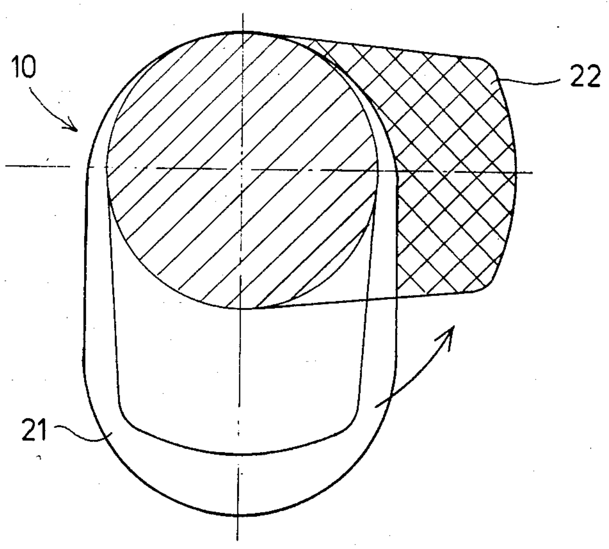
FIG. 11 illustrates the engagement member shown in FIG. 10 on an enlarged scale relative to FIG. 10, the engagement member being in its locked position.

One of the locking apertures 21 provided at the bottom of container 1 adjacent to its end 8 is illustrated in FIGS. 10 and 11. An engagement pin 22 associated with engagement member 10 is inserted into aperture 21 so that upon rotation of the member 10, the pin 22 is turned to the position shown in FIG. 11 to provide a secure locking.

Figure 12:
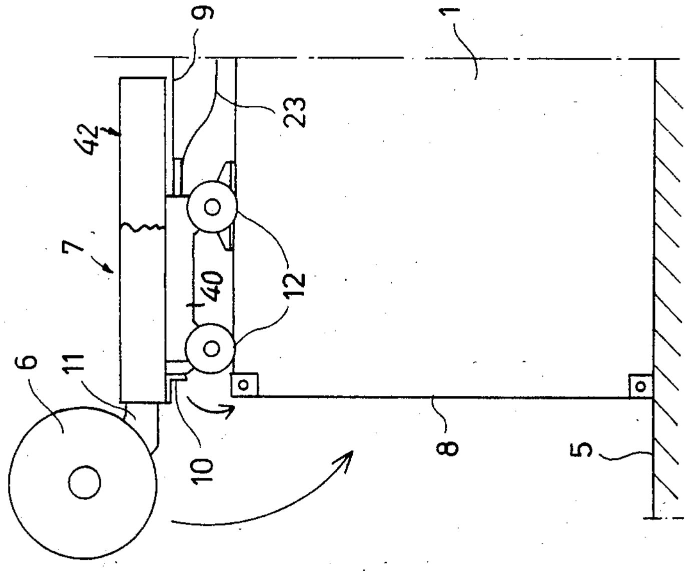

Referring to FIG. 12, another embodiment of auxiliary means 7 comprising a part of a lifting and transporting apparatus in accordance with the invention as illustrated. The auxiliary means 7 is remotely controlled by an operater situated in the transport means (not shown). Auxiliary means 7 is arranged to move over the top of the container 1 on transport wheels 12 to the end 8 thereof opposite from the end at which the transport means are located. However, unlike the auxiliary means described above in connection with FIG. 1–9, the auxiliary means 7 shown in FIG. 12 does not travel around the top edge of the container other than in the respects described below. The embodiment of auxiliary means 7 illustrated in FIG. 12 is hydraulically operated and to this end a flexible hydraulic tube 23 extends between auxiliary means 7 and the transport means supported by the wire cable 9.

Figure 14:
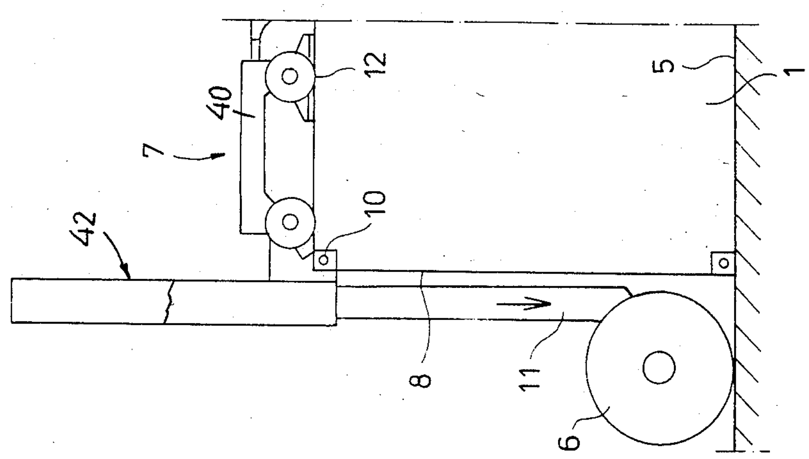
Figure 13:
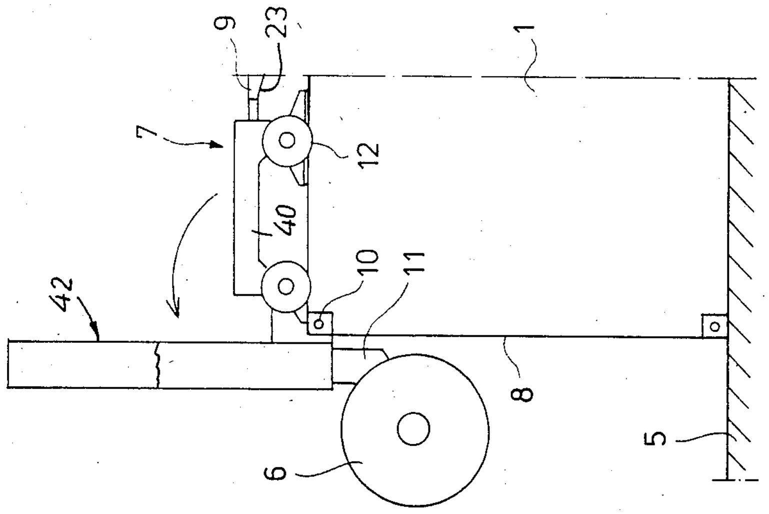

Referring to FIGS. 13 and 14 in conjunction with FIG. 12, the auxiliary means 7 includes a carriage 40 to which transport wheels 12 are journaled and a hydraulic cylinder arrangement 42 pivotally mounted to carriage 40 at its forward end. A lifting member 11 comprises the piston of the hydraulic cylinder arrangement 42 and carrying wheels 6 are journaled at the end of lifting member 11. An engagement member 10 is connected to the cylinder arrangement 42 as seen in the drawings.

In operation, after auxiliary means 7 has moved to the end 8 of container 1 under the control of remote control means (FIG. 12), the hydraulic cylinder arrangement 42 is pivoted until lifting member 11 extends substantially vertically (FIG. 13). At this time the engagement member 10 is actuated so as to lockingly engage within apertures formed at the upper region of container end 8. As seen in FIG. 14, the hydraulic cylinder arrangement 42 is actuated so as to lower lifting member 11 until the carrying wheels 6 engage the surface 5. The downward descent of lifting member 11 then continues whereby the end 8 of the container 1 is lifted from the surface 5 whereupon transport of the load may commence. When transport of the load has been completed, the above-described steps are repeated in reverse order.

Figure 15:
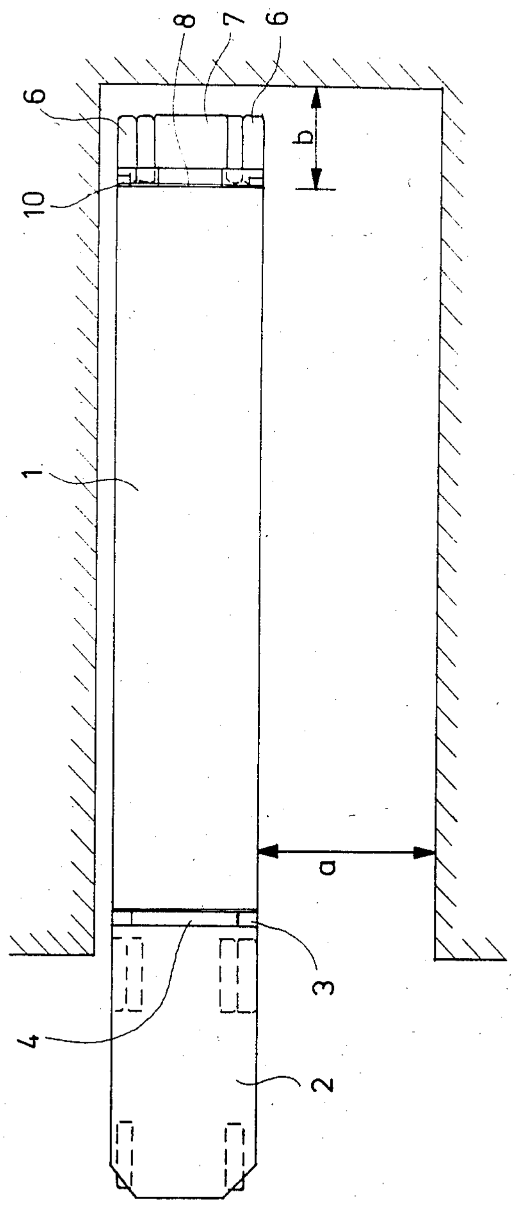
FIG. 15 is a schematic top plan view of transport means and auxiliary means coupled to opposite ends of a container being transported in accordance with the present invention.
Figure 16:
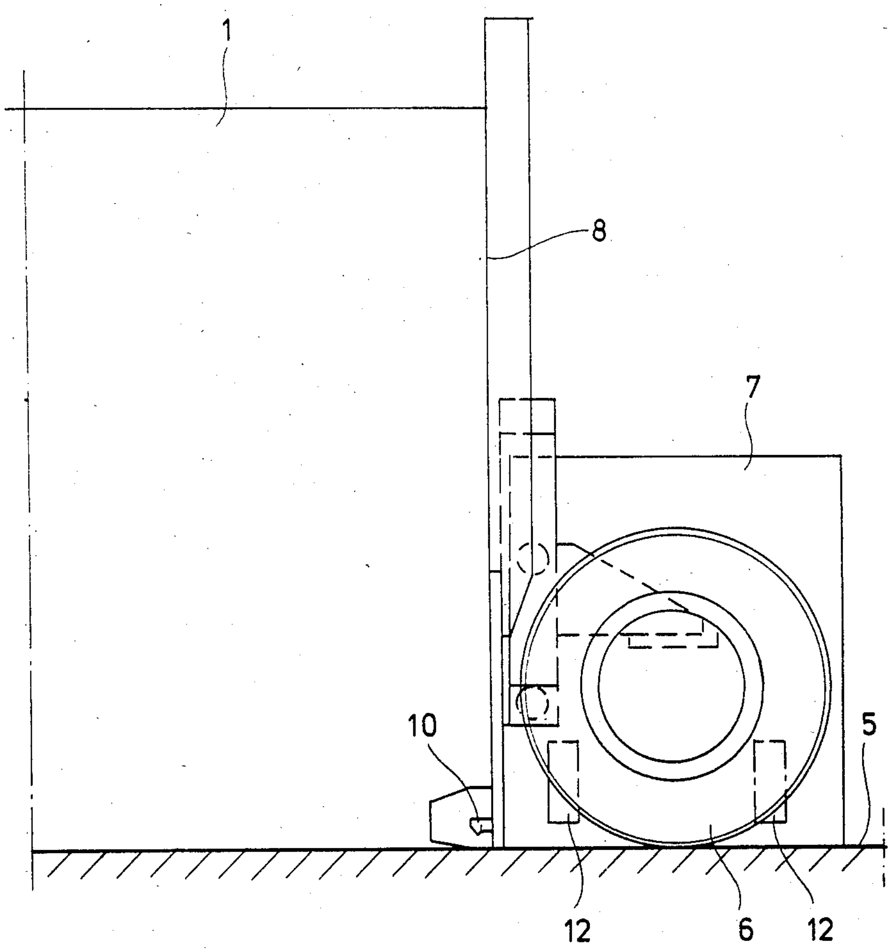
FIG. 16 is a schematic side elevation view of a third embodiment of auxiliary means of apparatus for lifting and transporting a load in accordance with the invention, the auxiliary means being illustrated as coupled to the end of the container being transported.
Figure 17:
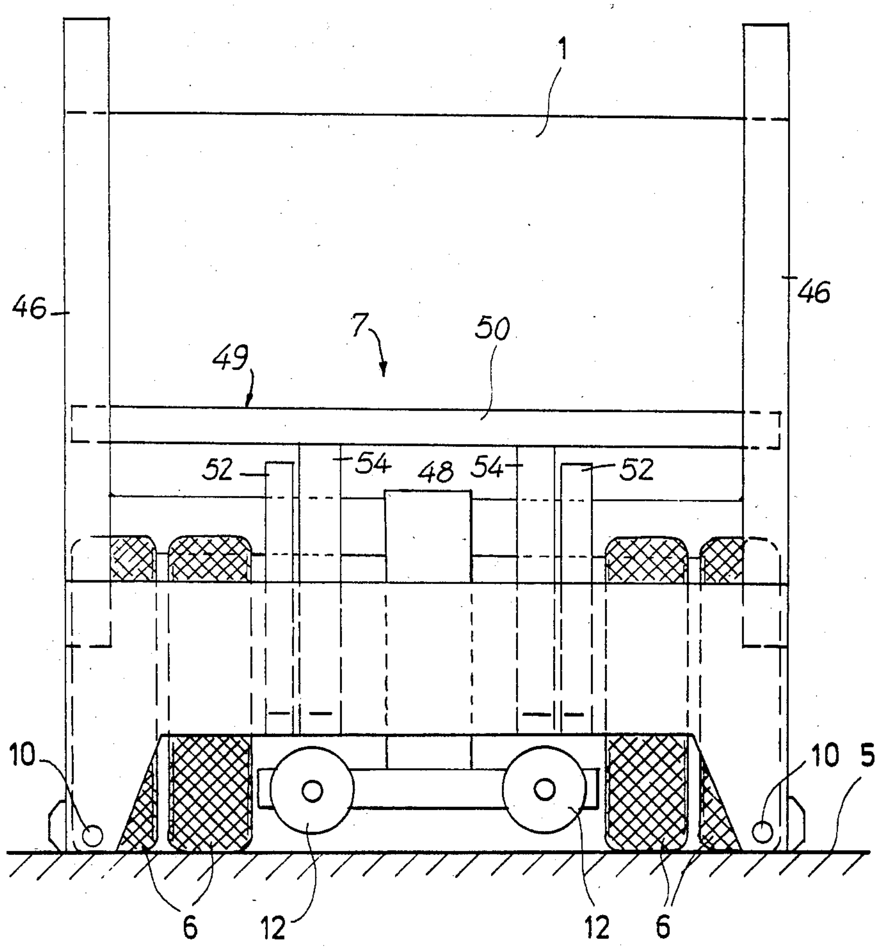
FIG. 17 is an end elevation view of the auxiliary means illustrated in FIG. 16.

Referring now to FIGS. 15–17, another embodiment of lifting and transporting apparatus in accordance with the invention is illustrated. This embodiment differs from the ones previously described in that the auxiliary means 7 is arranged to move from the transport means 2 on the surface 5 adjacent to the container 1 to the opposite end 8 of the container under the control of remote control means whereupon the gripping and lifting means of the auxiliary means 7 grip and lift the container end 8 for subsequent transport of the load. In this case, the minimum space required for the auxiliary means is designated a on one side of container 1, this dimension being slightly greater than the width of the container. A free space designated b is required at the end 8 of the container, this dimension depending upon the outer dimensions of auxiliary means 7. In embodiments of this type wherein the auxiliary means 7 are adapted to move over the surface 5 from the transport means 2 to the opposite end 8 of container 1, it is advantageous to mount the transport wheels 12 on axes which extend transversely with respect to the axes of the load carrying wheels 6.

Referring to FIGS. 16 and 17, the auxiliary means 7 shown in FIG. 15 are shown in somewhat greater detail. The auxiliary means 7 include a pair of frames which are slidable with respect to each other. A first frame is formed by a pair of vertical beams 46 to which a subframe 48 is fixed and to which in turn transport wheels 12 are journaled. A second frame includes a lifting subframe 49 including a horizontal member 50 slidably coupled to beams 46 and to which plates 52 are fixed on which carrying wheels 6 are journaled. The second frame is coupled to the first frame by means of lifting cylinders 54.

In operation, the auxiliary means 7 are moved under remote control on carrying wheels 12 into position at the opposite end 8 of container 1 whereupon the auxiliary means are secured to the bottom corners of container 1 by engagement members 10. The lifting cylinder 54 are actuated to slide the second frame downwardly whereupon carrying wheels 6 engage the surface 5 and continued downward movement causes the opposite end 8 of container 1 to be lifted.

In accordance with the invention the auxiliary means may be mechanically, hydraulically or electrically operated. The auxiliary means may be passive in which case the container transporting movement is effected solely by the transport means. Alternatively, the auxiliary means may be active in that the auxiliary means may contain a power source such, for example, as an electric motor or internal combustion engine for assisting in the transport of the container. Load transporting apparatus of this type will also require a break for stopping its motion.

It is essential that the auxiliary means are remote-controlled or internally programmed to move to the opposite end of the container and grip standard fixing members at that end with appropriate engagement members. After such mechanical interlocking, the auxiliary means lifts the opposite end of the container from the surface. The power required to drive the auxiliary means is obtained either from a power source included within the auxiliary means or transmitted from the transport means through an electric cable or flexible hydraulic tube or the like. In the case where the auxiliary means is completely independent of the transport means, i.e., where there are no interconnecting electric cables or hydraulic tubes, a wireless control may be provided such, for example, as by radio or infra-red light control. In all cases, however, it is desirable that the auxiliary means be provided with safety apparatus for preventing collisions with obstacles and that the transport means be provided with monitoring devices which will indicate the state of motion of the auxiliary means at any moment and the activity which it is carrying out.

It is also possible within the scope of the invention to provide that the transport means itself be remote controlled operating on its own power source and in cooperation with which a passive auxiliary means is programmed to operate.

Obviously, numerous modifications and variations of the present invention are possible in the light of the above teachings. For example, construction of the auxiliary means may be different from the construction of the embodiments illustrated herein. It is therefore to be understood that within the scope of the claims appended hereto, the invention may be practiced otherwise than as specifically disclosed herein.

What is claimed is:

1. In apparatus for lifting a unitary load having a first end and an opposed opposite end, such as a material containing container, from a surface and transporting the unitary load over the surface, said apparatus including transport means for lifting the first end of the load from the surface and separate auxiliary means provided with wheels for carrying the opposite end of the load during transport, the improvement comprising:

said auxiliary means includes propelling means control means for said propelling means for directing movement of said auxiliary means to the opposite end of the load; and wherein said auxiliary means includes means for gripping and then lifting the opposite end of the load for subsequent transport of the load.

2. The combination of claim 1 wherein the load has a top, and wherein said propelling means is capable of moving said auxiliary means on the top of the load to the opposite end of the load under the control of said control means, whereupon said gripping and lifting means of said auxiliary means grip and lift the other load end for subsequent transport of the load.

3. The combination of claim 1 wherein the load has a top, and wherein said propelling means is capable of moving said auxiliary means on the top of the load to the opposite end of the load under the control of said control means, and further including means for supporting said auxiliary means such that upon moving to the opposite load end on the top of the load, said auxiliary means descends onto the surface supported by said supporting member, and wherein said gripping means of said gripping and lifting means of said auxiliary means include a gripping member for gripping the opposite end of the load, whereby upon said auxiliary means descending onto the surface supported by said supporting member, said gripping member engages the opposite load end whereupon said lifting means lifts said opposite load end from the surface for subsequent transport of the load.

4. The combination of claim 3 wherein said supporting means include a wire cable extending between said transport means and said auxiliary means.

5. The combination of claim 1 wherein the load has a top, and wherein said propelling means is capable of moving said auxiliary means on the top of the load to the opposite end of the load under the control of said control means, and wherein said gripping means of said gripping and lifting means of said auxiliary means include a gripping member for gripping the opposite end of the load and wherein said lifting means of said gripping and lifting means of said auxiliary means include a lifting member provided with wheels and further including means for moving said lifting member downwardly to engage the surface for lifting the other load end from the surface.

6. The combination of claim 1 wherein said propelling means is capable of moving said auxiliary means on the surface adjacent to the load to the opposite end thereof under control of said control means, whereupon said gripping and lifting means of said auxiliary means grip and lift the other load end for subsequent transport of the load.

7. The combination of claim 1 wherein said transport means comprises a truck including means for gripping and lifting the first end of the load from the surface.

8. The combination of claim 1 wherein said control means include remote control means.

9. The combination of claim 1 wherein said control means include means associated with said auxiliary means for pre-programming the movement thereof.

* * * * *